US009398030B2

(12) United States Patent
Varshney et al.

(10) Patent No.: US 9,398,030 B2
(45) Date of Patent: *Jul. 19, 2016

(54) ASCERTAINING DOMAIN CONTEXTS

(71) Applicant: Microsoft Technology Licensing, LLC, Redmond, WA (US)

(72) Inventors: Govind Varshney, Sammamish, WA (US); Marc A. Silbey, Mercer Island, WA (US); Shankar Ganesh, Bellevue, WA (US); Robert Impollonia, Brooklyn, NY (US); Venkatraman V. Kudallur, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 376 days.

This patent is subject to a terminal disclaimer.

(21) Appl. No.: 14/035,430

(22) Filed: Sep. 24, 2013

(65) Prior Publication Data
US 2014/0026219 A1  Jan. 23, 2014

Related U.S. Application Data

(60) Division of application No. 12/757,831, filed on Apr. 9, 2010, now Pat. No. 8,572,634, which is a continuation of application No. 11/150,869, filed on Jun. 10, 2005, now Pat. No. 7,735,094.

(51) Int. Cl.
*G06F 9/44* (2006.01)
*H04L 29/06* (2006.01)
*G06F 17/30* (2006.01)

(52) U.S. Cl.
CPC ...... *H04L 63/1408* (2013.01); *G06F 17/30887* (2013.01); *G06F 17/30902* (2013.01)

(58) Field of Classification Search
None
See application file for complete search history.

(56) References Cited

U.S. PATENT DOCUMENTS

| | | | |
|---|---|---|---|
| 5,805,884 A | 9/1998 | Sitbon et al. | |
| 6,170,081 B1 | 1/2001 | Fontana et al. | |
| 6,202,159 B1 * | 3/2001 | Ghafir | G06F 9/5027 713/151 |
| 6,272,485 B1 | 8/2001 | Sragner | |
| 6,327,608 B1 | 12/2001 | Dillingham | |
| 6,442,602 B1 | 8/2002 | Choudhry | |
| 6,442,620 B1 | 8/2002 | Thatte et al. | |
| 6,647,381 B1 | 11/2003 | Li et al. | |
| 6,748,418 B1 | 6/2004 | Yoshida et al. | |
| 6,754,829 B1 * | 6/2004 | Butt | G06F 21/33 713/175 |
| 6,792,459 B2 | 9/2004 | Elnozahy et al. | |

(Continued)

OTHER PUBLICATIONS

"Corrected Notice of Allowance", U.S. Appl. No. 12/757,831, (Sep. 30, 2013), 4 pages.

(Continued)

*Primary Examiner* — Van Nguyen
(74) *Attorney, Agent, or Firm* — Bryan Webster; Judy Yee; Micky Minhas

(57) ABSTRACT

Various embodiments pertain to ascertaining domain contexts. In one embodiment, an application receives content that may contain a script (i.e. code). In this case, the domain context is ascertained and the script is executed in the context of the domain associated with the received content, rather than requiring the application or some other component to navigate to a location, such as a web location, to attempt to ascertain the domain context of the script. In another embodiment, third party objects or code are required to provide their domain context to an application in order for the application to make a security-based decision.

20 Claims, 5 Drawing Sheets

(56) References Cited

U.S. PATENT DOCUMENTS

| | | | |
|---|---|---|---|
| 6,874,084 B1 | 3/2005 | Dobner et al. | |
| 6,904,453 B2 | 6/2005 | Shuster et al. | |
| 6,961,929 B1 | 11/2005 | Pelegri-Llopart et al. | |
| 6,990,528 B1 * | 1/2006 | Neal | G06F 3/0605 709/204 |
| 7,013,388 B2 | 3/2006 | Fisk et al. | |
| 7,039,699 B1 | 5/2006 | Narin et al. | |
| 7,076,786 B2 | 7/2006 | Burd et al. | |
| 7,159,111 B1 * | 1/2007 | Ganapathy | G06F 21/606 709/212 |
| 7,469,302 B2 | 12/2008 | Whittle et al. | |
| 7,735,094 B2 | 6/2010 | Varshney | |
| 8,572,634 B2 | 10/2013 | Varshney et al. | |
| 2002/0116407 A1 | 8/2002 | Negishi et al. | |
| 2002/0124172 A1 | 9/2002 | Manahan | |
| 2002/0184491 A1 | 12/2002 | Morgan et al. | |
| 2003/0028762 A1 | 2/2003 | Trilli et al. | |
| 2003/0177274 A1 | 9/2003 | Sun | |
| 2004/0193885 A1 | 9/2004 | Fisk et al. | |
| 2005/0050547 A1 | 3/2005 | Whittle et al. | |
| 2005/0268100 A1 | 12/2005 | Gasparini et al. | |
| 2005/0278792 A1 | 12/2005 | Ramani et al. | |
| 2006/0053293 A1 | 3/2006 | Zager et al. | |
| 2006/0218403 A1 | 9/2006 | Sauve et al. | |
| 2007/0006148 A1 | 1/2007 | Varshney | |
| 2010/0192165 A1 | 7/2010 | Varshney | |

OTHER PUBLICATIONS

"Final Office Action", U.S. Appl. No. 12/757,831, (Feb. 11, 2013), 9 pages.

"Non-Final Office Action", U.S. Appl. No. 11/150,869, (Sep. 3, 2009), 9 pages.

"Non-Final Office Action", U.S. Appl. No. 12/757,831, (Aug. 22, 2012),10 pages.

"Notice of Allowance", U.S. Appl. No. 11/150,869, (Feb. 9, 2010), 8 pages.

"Notice of Allowance", U.S. Appl. No. 12/757,831, (Jun. 19, 2013), 7 pages.

"Protecting Commercial Secure Web Servers from Key-Finding Threats", *nCipher, Inc.*, Available at <www.nciphercom/uploads/resources/pcws.pdf>,(1999),12 pages.

"Restriction Requirement", U.S. Appl. No. 11/150,869, (May 20, 2009), 6 pages.

"Restriction Requirement", U.S. Appl. No. 12/757,831, (Jun. 7, 2012), 6 pages.

Anupam, et al., "Secure Web Scripting", *1998 IEEE*, (1998), pp. 46-55.

Herzberg, Amir et al., "Protecting (even) Naive Web Users, or: Preventing Spoofing and Establishing Credentials of Web Sites", *Bar Ilan University*, Available at <www.cs.bu.ac.il/~herzea/papers/ecommerce/trusted credentials area.pdf>,(Jul. 18, 2004), 26 pages.

Radosevic, Danijel et al., "Development of a Higher-Level Multimedia Scripting Language", *23rd Int. Conf. Information Technology Interfaces ITI 2001*, (Jun. 19, 2001), pp. 201-208.

Spanias, Andreas et al., "Development of New Functions and Scripting Capabilities in Javaa-DSP for Easy Creation and Seamless Integration of Animated DSP Simulations in Web Courses", 2001 IEEE, (2001), pp. 2717-2720.

Tam, et al., "A Fast and Flexible Framework of Scripting for Web Application Development: A Preliminary Experience Report", *2000 IEEE*, (2000), pp. 450-455.

Verisign Inc., "Licensing VeriSign Certificates: Securing Multiple Web Server and Domain Configurations", *White Paper*, Available at <www.msctrustgate.com/pdf/licensing.pdf>,(Nov. 2, 2001),15 pages.

* cited by examiner

_US 9,398,030 B2_

ASCERTAINING DOMAIN CONTEXTS

RELATED APPLICATIONS

This application is a continuation of and claims priority to U.S. patent application Ser. No. 12/757,831 which is a divisional of and claims priority to U.S. patent application Ser. No. 11/150,869, filed on Jun. 10, 2005, the disclosure of which are incorporated herein by reference in their entirety.

BACKGROUND

Ascertaining domain contexts can be useful for a number of reasons. For example, cross domain security issues can arise when a script (i.e. software code) executes in the wrong domain. Scripts can execute in the wrong domain for reasons that include, among others, architectural flaws in an application's code path. Cross domain exploits can allow malicious code to access and manipulate information that would otherwise be unavailable to the code.

One type of application that can be susceptible to cross domain exploits is the web browser. In this context, consider the following. When a browser application browses to a web page, that particular web page can host other web pages and objects within it. That is, the web page can retrieve content from other web sites for use in conjunction with the web page. For example, an image or some other object on or associated with a web page may be downloaded from a web site which is different from the site from which the web page itself is downloaded. One of the problems with this scenario, as will be appreciated by the skilled artisan, is that while the site from which the web page is downloaded may be considered as "safe", the site from which the image or object is downloaded may not be safe and, in fact, may constitute a rogue web site.

What can happen as a result of this situation is that rogue content may maliciously attempt to interact with the web page with which it is associated, or with content presented in other windows that are open on the user's computer. For example, a rogue object may attempt to capture user information (as by recording the user's keystrokes) and provide the information to an unauthorized entity or person.

Other cross domain boundary issues can arise from third party code or controls that are designed to execute in connection with an application. Again, in the context of a browser application, consider the following. When a web browser receives HTML content for a particular web page, the HTML may include code that identifies data that is intended to be processed by a third party control such as, for example, an ActiveX control, a browser helper object, or some other pluggable component. The browser application then typically takes steps to activate or instantiate the appropriate control and makes the data available for the control to process and render. One problem with this scenario, however, is that such controls and other third party code do not typically have to provide the application—in this case the browser application—with its domain context—that is, the context of the domain in connection with which the control or code is supposed to be running. By knowing the domain context associated with a particular control or piece of third party code, an intelligent decision could be made by the application as to whether to allow the control or code to execute. However, by not knowing the domain associated with the control or code, any such informed decision cannot be made.

SUMMARY

Various embodiments pertain to ascertaining domain contexts. In one embodiment, an application receives content that may contain a script (i.e. code) in the form of a URL. In this case, the script is executed in the context of the domain associated with the received content, rather than requiring the application or some other component to attempt to navigate to a script URL, such as a web location, to attempt to ascertain the domain context of the script.

In another embodiment, third party objects or code are required to provide their domain context to an application in order for the application to make a security-based decision.

BRIEF DESCRIPTION OF THE DRAWINGS

The disclosed embodiments will be described with reference to the accompanying drawings, which show important sample embodiments of the invention and which are incorporated in the specification hereof by reference, wherein.

DETAILED DESCRIPTION

Overview

Figure 1:
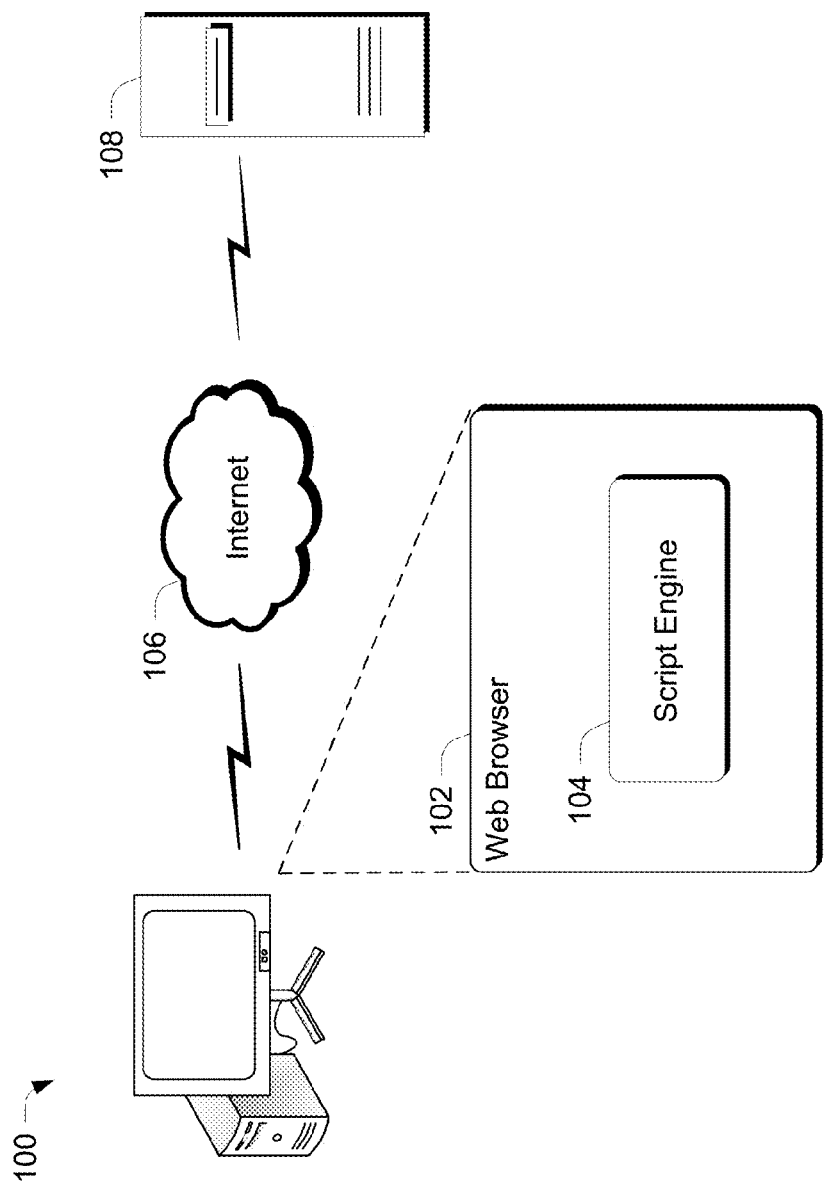
FIG. 1 is a high level diagram of a system in accordance with one embodiment.

Various embodiments described below are directed to, among other things, dealing with and enforcing cross domain boundaries. In one embodiment, an application receives content that may contain a script (i.e. code) in the form of a URL. In this case, the script is executed in the context of the domain associated with the received content, rather than requiring the application or some other component to attempt to navigate to a script URL, such as a web location, to attempt to ascertain the domain context of the script. For example, in one embodiment, an application, such as a web browser application, causes script that it receives in connection with HTML for a web page, to execute and run in the context of the page from which it came, rather than attempting to navigate to a script or code URL location to ascertain the domain context of the script. This embodiment is discussed under the heading "Executing Script in the Context of the Page From Which it Comes" below.

In another embodiment, third party objects or code are required to provide their domain context to an application in order for the application to make a security-based decision. This can be done in a couple of different ways. For example, the objects or code itself can be aware that they need to provide the domain context and hence, when calls are made by the object, the domain context is passed as well. Additionally or alternately, the objects or code can be wrapped such that the objects or code are not necessarily aware that domain context needs to be passed. Yet, because of the wrapper, the domain context is passed whenever the objects or code makes a call to another component. This embodiment is discussed under the heading "Requiring Domain Context for Third Party Objects and Code" below.

Executing Script in the Context of the Page from which it Comes

In the example that follows, an application in the form of a web browser application, and content in the form of HTML is used to illustrate the utility of the inventive embodiments. It is to be appreciated and understood that applications other than web browsers, and content other than HTML can be utilized without departing from the spirit and scope of the claimed subject matter.

In this embodiment, content, e.g. HTML content, that is received by an application, e.g. a web browser application, is parsed to identify script portions. Once the script portions are identified, the URL of the web page from where it came is identified to ascertain the domain context of the script portions. In the illustrated and described embodiment, this is done without employing a navigation activity in which an attempt is made to navigate to a location, such as a web location, to ascertain the domain context.

With regard to a navigation activity, consider the following. In at least some systems, a navigation activity involves an application communicating with a handler object for a particular URL syntax. For example, to navigate to a script URL, the application would typically call a script URL handler and pass the handler the script. The handler would then attempt to ascertain the domain context. Thus, in this context, in at least one embodiment, not employing a navigation activity would mean not employing another handler object in the manner mentioned above.

In the particular embodiment described below, the domain context is ascertained by contacting a script engine to ascertain the domain associated with the script portions. Once the domain associated with the script portions is ascertained, the script can be executed in the context of its domain. Put another way, the script can be executed in the context of the HTML from which it came. This is a departure from past approaches.

In the past, at least some web browsers would treat a URL containing script as a URL and would attempt to navigate to this URL to ascertain the domain context of the script. As an example, consider the following HTML excerpt that might be received by a web browser:

<a href="javascript:alert( )">click here</a>

Here, the HTML includes an anchor tag that contains script or code that is to be executed in connection with a web page that is presented to a user. In this example, assume that the script presents an alert dialog for the user. Along with the script and as part of the page that is displayed for the user, a hyperlink "here" may be displayed on the page. When the user clicks the "here" hyperlink, in the past, the web browser would attempt to navigate to a particular web location and ascertain the domain context associated with the script. In this simple case, the browser would likely ascertain the domain context and hence, the script alert would be executed in the ascertained domain context. Accordingly, in the past then, when the user clicked on the hyperlink, a navigation would occur and the script would be executed in the domain context ascertained via the navigation. It is to be appreciated, however, that this is but a simple example. Specifically, in this example, there is only one window or page, and therefore only one domain. In this case, it is not possible to find the wrong domain. There are complex asynchronous scenarios, however, in which problems can be encountered in finding the appropriate domain context. Hence, in many complex scenarios, problems in ascertaining the proper domain context via the induced navigation can lead to or at least make possible a script executing in a domain that is not proper. For example, if there were multiple windows or the script URL opened another window, then there would be multiple domains and a chance of getting the wrong domain context.

FIG. 1 is a high level diagram that illustrates a system 100 that includes a computing device executing a web browser application 102 and a script engine 104 in accordance with one embodiment. The computing device is communicatively linked via the Internet 106 with one or more web servers 108 from which the computing device can receive content, such as HTML, that defines web pages that are displayable by web browser.

In the illustrated and described embodiment, when web browser 102 receives HTML content, it processes the HTML content and identifies any scripts associated with the HTML content. The HTML can also typically identify an associated script engine (i.e. an object that processes scripts) using, for example, a class identifier attribute of the HTML. The web browser can then call an appropriate interface to instantiate the appropriate script engine. In this example, the web browser would be considered as the scripting host and is said to "own" the scripting engine. Typically then, the host application—in this case the web browser 102—calls the script engine 104 and provides the script to the script engine for processing.

Now, having identified that the HTML that it received contains a script, the web browser 102 now ascertains the domain context of the script. In this example, this is done by contacting the script engine 104 and ascertaining from the script engine which pages or domains the script engine attached to when it received the script from the web browser. Specifically, the domain context is taken from the page that contains the downloaded HTML including script code. The domain context is stored with the HTML when it gets downloaded.

Now that the browser has ascertained the domain context of the script that it received, the web browser can now take measures to ensure and enforce cross domain boundaries. That is, the web browser can now take steps to ensure that the script executes in the domain context in which it is intended to execute. For example, once the web browser ascertains the domain context of the script, it can ascertain the domain context of the target window—that is, the target window in which the script is to execute. If the domain contexts of the script and the target window match, then the web browser can call a method on the script engine 104 to execute the script in the target window. On the other hand, if the domain contexts do not match (for example, if the script were attempting to execute in a different target window for a malicious purpose), the application can disallow this by making an appropriate call to the script engine.

Accordingly, this process executes the script in the context of the actual HTML from which it came.

Figure 2:
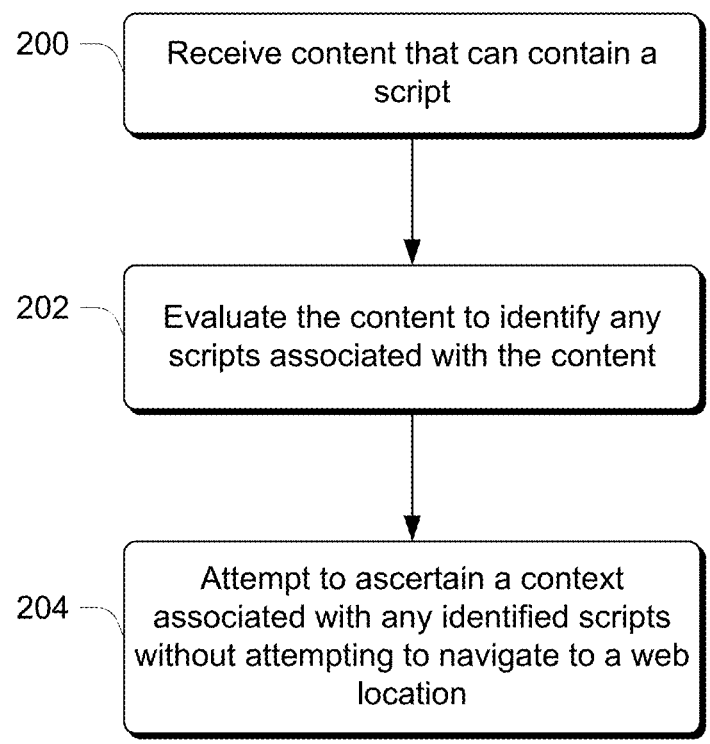
FIG. 2 is a flow diagram that describes steps in a method in accordance with one embodiment.

FIG. 2 is a flow diagram that describes steps in a method in accordance with one embodiment. The method can be implemented in connection with any suitable hardware, software, firmware or combination thereof.

Step 200 receives content that can contain a script. The received content can comprise any suitable type of content. In but one embodiment described above, such content comprises HTML content that describes web page content, and this act is performed by a suitably configured web browser application. Other types of content can include, by way of example and not limitation, email content, instant messaging content that includes code, content associated with file transfers and the like.

Step 202 evaluates the content to identify any scripts associated with the content. This step can be performed in any suitable way. That is, various different types of script can have various identifying characteristics, such as syntax-based characteristics, that enable it to be identified in the context of the content of which it is a part. For example, in the context of HTML that is received by a web browser application, the script may be identified, at least in part, by looking for a URL that does not have an associated domain. For example, javascript can comprise part of the HTML that a web browser receives. One way of representing javascript in HTML is in a URL-like fashion, except that the representation does not have an associated domain. Hence, this is one way of identifying a script. Other ways can be utilized without departing from the spirit and scope of the claimed subject matter. In addition, this step can be executed to look for any code that that should be executed in a particular context. For example, C++ code may be meant to only run in a specific application or only on a particular server.

If any scripts are identified in the content that is received, step 204 attempts to ascertain a context associated with the identified script(s) without attempting to navigate to a web location. In one embodiment, the context that is attempted to be ascertained is a domain context. This step can be performed in any suitable way. For example, in the web browser application example above, the domain context was able to be ascertained by contacting the associated script engine to ascertain domains or pages to which the script engine attached. This step can, however, be performed in other ways without departing from the spirit and scope of the claimed subject matter. For example, in some embodiments, the script or code could carry with it its own context. Such context could, for example, reside in the form of a verifiable signature.

Once the domain of the script has been ascertained, the application can make a domain context-based decision. For example, the application can take whatever steps are appropriate for enforcing cross domain security. For example, as in the example above, a check can be made to ascertain whether the script's domain context matches with the target window's domain context. If the domain contexts match, then the script is allowed to execute. Other types of decisions that might be made can include decisions that pertain to different types of functionality that may or may not be permitted. For example, an email client may only allow a special format to be received from specific servers, such as a Hotmail server. Alternately or additionally, an application which downloads content such as software updates may only download the content if it comes from a specific domain.

Accordingly, the above-described embodiment can enforce cross domain security by taking steps to ensure that scripts are identified and then executed in the proper domain context.

Requiring Domain Context for Third Party Objects and Code

In another embodiment, third party objects or code are required to provide their domain context to an application in order for the application to make a security-based decision. The application can comprise any suitable application or type of application. For example, the application can comprise a web application, such as a web-based email application or web browser. Alternately or additionally, the application can comprise other types of applications.

The security-based decision can be one that allows the objects or code to perform a particular functionality or not. In the examples described below, two different approaches are set forth. In a first approach, third party objects or code are required to pass, in associated calls that they make to various applications, their domain context. In a second approach, third party objects are wrapped or encapsulated in a manner in which various calls that the objects or code makes provide the domain context of the object or code. This particular approach can be utilized without requiring the objects or code to change their architecture. As such, this approach is useful in the context of supporting legacy objects or code.

First Approach—Objects/Code Pass Domain Context

In a first approach, objects or code are provided with a way of determining or ascertaining their domain context so that they can use that domain context in calls to various applications. The applications, in turn, can then make a decision, based on the passed-in domain context, as to whether to allow the object or code to execute whatever functionality it was intending to execute.

Figure 3:
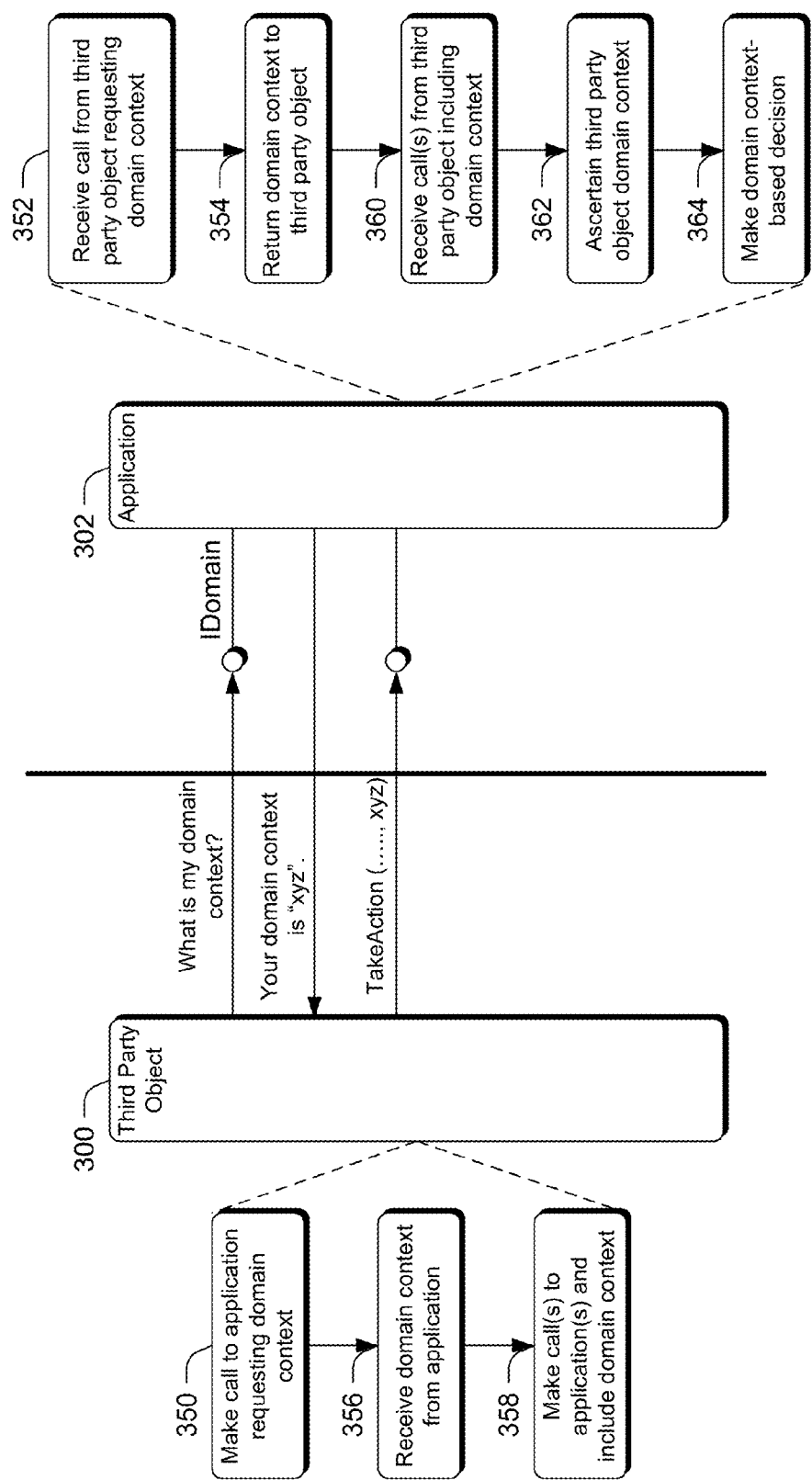
FIG. 3 is a high level system/method diagram that illustrates aspects of one embodiment.

As an example, consider FIG. 3 which illustrates a system and a related method in accordance with one embodiment. In this example, a third party object 300 is provided and can constitute any suitable object. For purposes of this disclosure, "third party object" and "code" are used interchangeably.

For example, third party object 300 can comprise an object that is instantiated as a result of application 302 receiving some type of content. For example, in an event that application 302 comprises a web browser application, third party object 300 might be instantiated or activated responsive to application 302 receiving HTML content that contains data intended to be processed by an instance of a particular object. For example, the HTML content may include data and an indication that the data is to be processed and rendered by a flash media object.

Once object 300 is activated or instantiated, the object makes a call, at step 350, to an application requesting its domain context. In the illustrated example, this is represented by a call from object 300 to an interface IDomain requesting its domain context. Responsively, application 302 receives the call, at step 352, from the third party object requesting its domain context. Applications can ascertain domain context by asking the networking object which downloaded the content. Essentially, the application asks for the source identifier that the content came from. In the case of a web browser, this would be the server name. Application 302, at step 354, returns the domain context to the third party object. In the illustrated example, this is represented by a return from the application to the object with the domain context "xyz". The third party object receives, at step 356, the domain context from the application and, at step 358, makes one or more subsequent calls to the application (or other applications) and includes, along with the call, its domain context. The domain context can be represented in a call parameter. In the illustrated example, this is represented by a call TakeAction ( . . . , xyz) that is made on the application 302. In the illustrated and described embodiment, third party objects can be required to provide their domain context any time they make a call on another object or application.

Responsively, application 302 receives the call(s), at step 360, from the third party object, including the domain context. Step 362 then ascertains the third party object's domain context and, in turn, step 364 makes a domain context-based decision. Any suitable decision can be made. For example, by knowing the domain context of the object that makes a call, the call recipient can decide whether to allow the call to proceed or not. As an example, consider the following.

Assume that third party object 300 receives its domain context "xyz" and calls an application that does not recognize the domain context, is otherwise configured to not allow any operations that are associated with the "xyz" context, or ascertains that the object's domain context does not match a target window domain context. In this case, the application can refuse to allow the call to execute. In this manner, cross domain security can be enforced.

Second Approach—Objects/Code Wrapped for Context Passing

In the second approach, objects or code are wrapped in a manner which enables the domain context of the object or code to be provided to an application when the application is called. In this embodiment, the object need not be aware of the necessity to provide its domain context when call applications.

Figure 4:
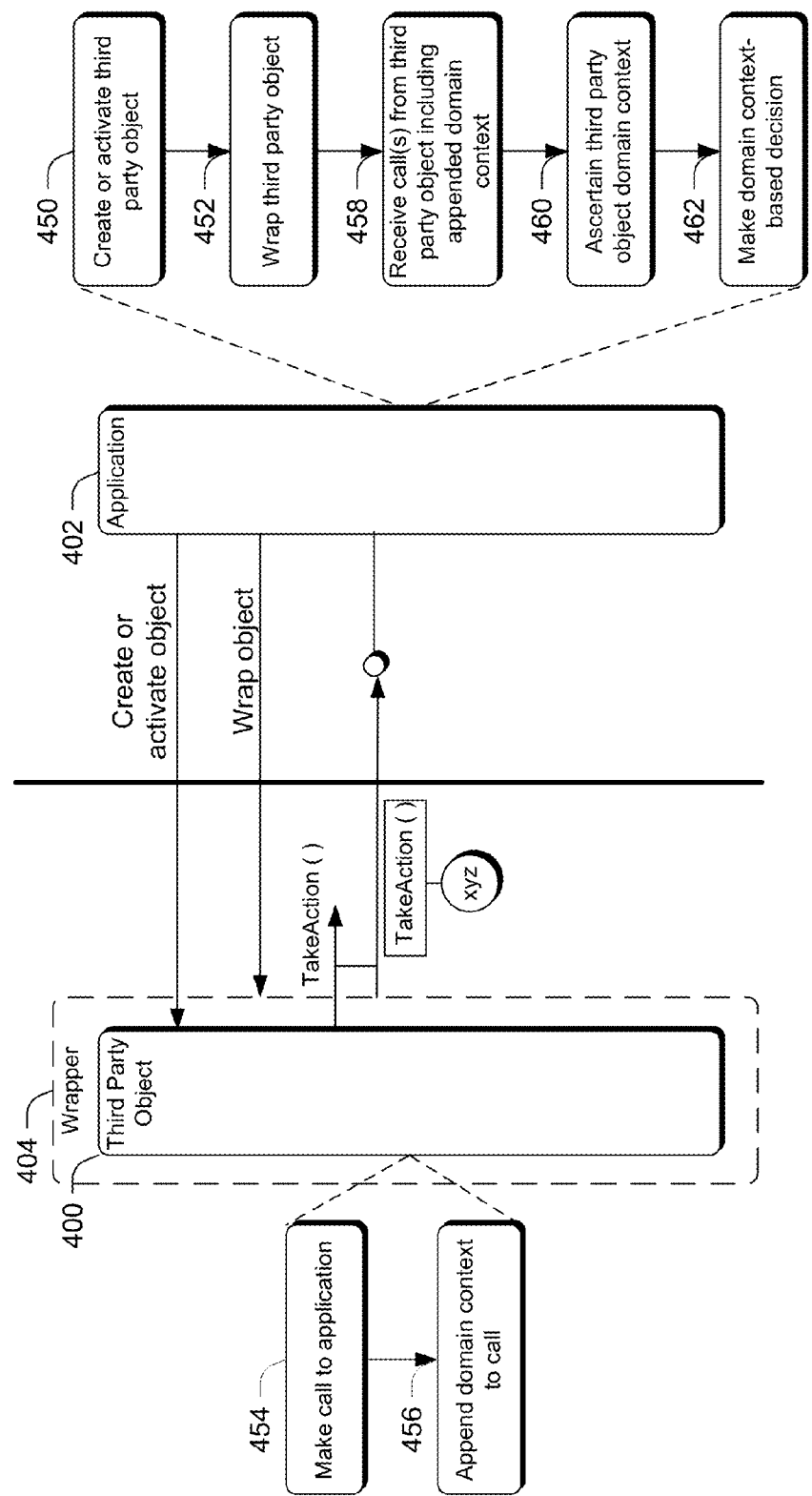
FIG. 4 is a high level system/method diagram that illustrates aspects of one embodiment.

As an example, consider FIG. 4 which illustrates a system that includes a third party object 400 and an application 402. In this example, third party object 400 can constitute any suitable object. For example, third party object 400 can comprise an object that is instantiated as a result of application 402 receiving some type of content. For example, in an event that application 402 comprises a web browser application, third party object 400 might be instantiated or activated responsive to application 402 receiving HTML content that contains data intended to be processed by an instance of a particular object. For example, the HTML content may include data and an indication that the data is to be processed and rendered by a flash media object. Accordingly, application 402 creates or activates, at step 450, the third party object. Application 402 then wraps, at step 452, the third party object. Wrapping of the object can take place in any suitable way and need not necessarily be considered as a step that is different from or in addition to step 450. For example, application 402 can own the activation space in which the object is activated. In this case, by virtue of owning the activation space, application 402 can take steps to ensure that the domain context of third party object 400 is provided in subsequent calls. A wrapper for third party object 400 is indicated at 404.

At step 454, third party object 400 makes a call to application 402. In this example, the call is illustrated as a TakeAction 0 call. At step 456, wrapper 404 appends a domain context to the call that is made by the third party object. In the illustrated example, this is represented as the domain context "xyz" which is illustrated as appended to the call that third party object 400 makes.

Application 402 receives, at step 458, one or more calls from the third party object including the appended domain context and step 460 ascertains the third party object's domain context. In turn, step 462 makes a domain context-based decision. Any suitable decision can be made. For example, by knowing the domain context of the object that makes a call, the call recipient can decide whether to allow the call to proceed or not. As an example, consider the following.

Exemplary Computing System

Figure 5:
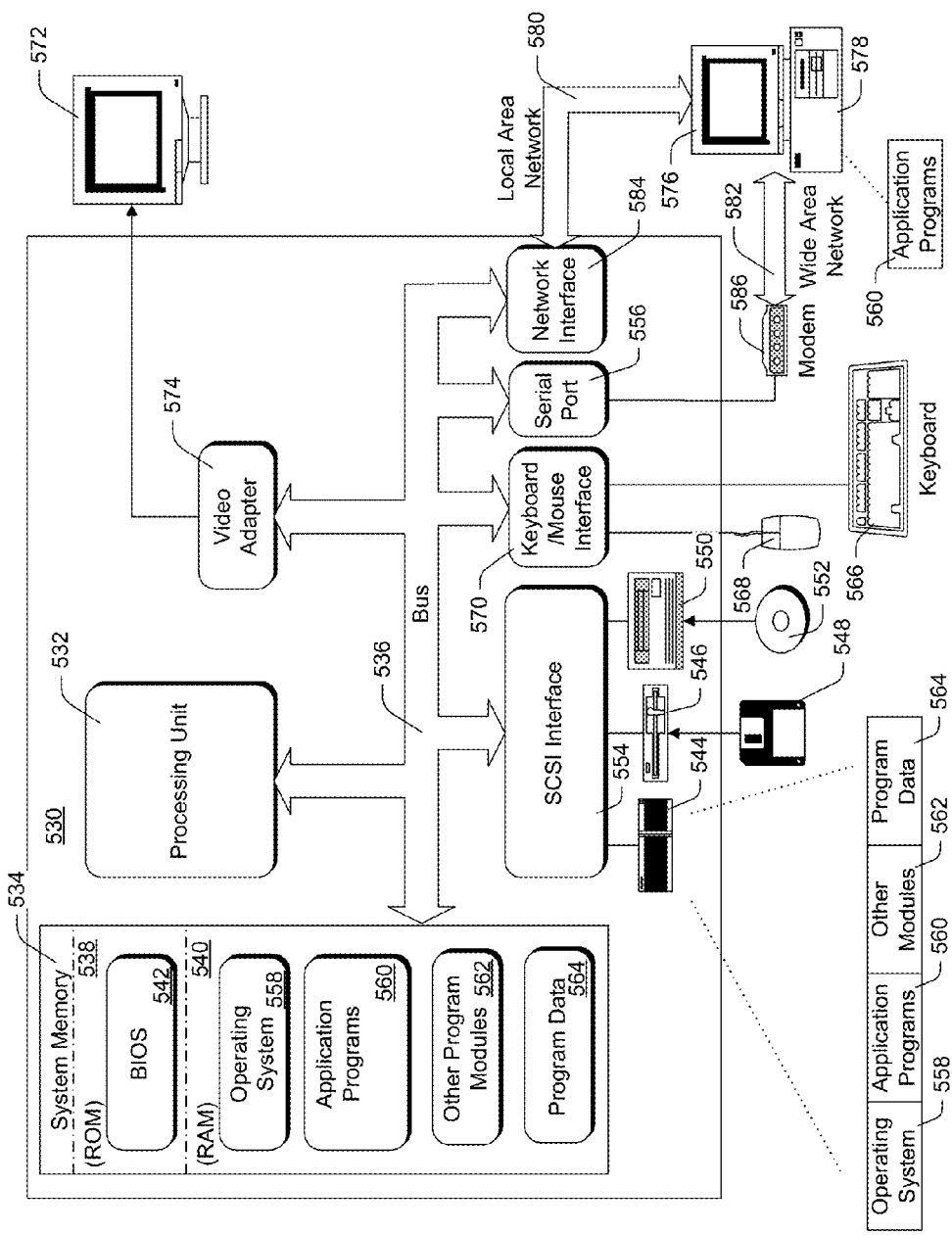
FIG. 5 illustrates an exemplary computing device that can be used to implement one or more embodiments.

FIG. 5 shows an exemplary computer system having components that can be used to implement one or more of the embodiments described above.

Computer system 530 includes one or more processors or processing units 532, a system memory 534, and a bus 536 that couples various system components including the system memory 534 to processors 532. The bus 536 represents one or more of any of several types of bus structures, including a memory bus or memory controller, a peripheral bus, an accelerated graphics port, and a processor or local bus using any of a variety of bus architectures. The system memory 534 includes read only memory (ROM) 538 and random access memory (RAM) 540. A basic input/output system (BIOS) 542, containing the basic routines that help to transfer information between elements within computer 530, such as during start-up, is stored in ROM 538.

Computer 530 further includes a hard disk drive 544 for reading from and writing to a hard disk (not shown), a magnetic disk drive 546 for reading from and writing to a removable magnetic disk 548, and an optical disk drive 550 for reading from or writing to a removable optical disk 552 such as a CD ROM or other optical media. The hard disk drive 544, magnetic disk drive 546, and optical disk drive 550 are connected to the bus 536 by an SCSI interface 554 or some other appropriate interface. The drives and their associated computer-readable media provide nonvolatile storage of computer-readable instructions, data structures, program modules and other data for computer 530. Although the exemplary environment described herein employs a hard disk, a removable magnetic disk 548 and a removable optical disk 552, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 544, magnetic disk 548, optical disk 552, ROM 538, or RAM 540, including an operating system 558, one or more application programs 560, other program modules 562, and program data 564. A user may enter commands and information into computer 530 through input devices such as a keyboard 566 and a pointing device 568. Other input devices (not shown) may include a microphone, joystick, game pad, satellite dish, scanner, or the like. These and other input devices are connected to the processing unit 532 through an interface 570 that is coupled to the bus 536. A monitor 572 or other type of display device is also connected to the bus 536 via an interface, such as a video adapter 574. In addition to the monitor, personal computers typically include other peripheral output devices (not shown) such as speakers and printers.

Computer 530 commonly operates in a networked environment using logical connections to one or more remote computers, such as a remote computer 576. The remote computer 576 may be another personal computer, a server, a router, a network PC, a peer device or other common network node, and typically includes many or all of the elements described above relative to computer 530, although only a memory storage device 578 has been illustrated in FIG. 5. The logical connections depicted in FIG. 5 include a local area network (LAN) 580 and a wide area network (WAN) 582. Such networking environments are commonplace in offices, enterprise-wide computer networks, intranets, and the Internet.

When used in a LAN networking environment, computer 530 is connected to the local network 580 through a network interface or adapter 584. When used in a WAN networking environment, computer 530 typically includes a modem 586 or other means for establishing communications over the wide area network 582, such as the Internet. The modem 586, which may be internal or external, is connected to the bus 536 via a serial port interface 556. In a networked environment, program modules depicted relative to the personal computer 530, or portions thereof, may be stored in the remote memory storage device. It will be appreciated that the network connections shown are exemplary and other means of establishing a communications link between the computers may be used.

Generally, the data processors of computer 530 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The various embodiments described above can, among other things, enforce cross domain boundaries. In one embodiment, an application receives content that may contain a script (i.e. code) in the form of a URL. In this case, the script is executed in the context of the domain associated with the received content, rather than requiring the application or some other component to attempt to navigate to a script URL location, such as a web location, to attempt to ascertain the domain context of the script. In another embodiment, third party objects or code are required to provide their domain context to an application in order for the application to make a security-based decision.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
receiving, at a computing device, a call from a third party object that requests a domain context;
ascertaining, by a web application implemented at the computing device, the domain context of the third party object;
returning, by the computing device, the domain context to the third party object;
requiring, by the computing device, the third party object to include its associated domain context in subsequent calls that the third party object makes;
receiving a subsequent call from the third party object;
ascertaining, from the subsequent call, the domain context of the third party object; and
making a domain context-based decision based on the ascertained domain context by refusing to allow the subsequent call to execute if the third party object's ascertained domain context does not match a target window domain context or allowing the subsequent call to execute if the third party object's ascertained domain context matches the target window domain context.

2. The computer-implemented method of claim 1, wherein the making the domain context-based decision comprises refusing to allow the subsequent call to execute.

3. The computer-implemented method of claim 1, wherein the making the domain context-based decision comprises allowing the subsequent call to execute.

4. The computer-implemented method of claim 1, wherein the receiving the call that requests the domain context is performed by a web application.

5. The computer-implemented method of claim 1, further comprising, prior to the receiving the call, receiving HTML content that contains a script that activates or instantiates the third party object.

6. The computer-implemented method of claim 5, wherein the ascertaining the domain context of the third party object comprises ascertaining a source identifier of the HTML content.

7. A system comprising:
at least a memory and a processor to implement a web application, the web application configured to perform operations comprising:
receiving a call from a third party object that requests a domain context;
ascertaining the domain context of the third party object;
returning the domain context to the third party object;
requiring the third party object to include its associated domain context in subsequent calls that the third party object makes;
receiving a subsequent call from the third party object;
ascertaining, from the subsequent call, the domain context of the third party object; and
making a domain context-based decision based on the ascertained domain context by refusing to allow the subsequent call to execute if the third party object's ascertained domain context does not match a target window domain context or allowing the subsequent call to execute if the third party object's ascertained domain context matches the target window domain context.

8. The one or more computer-readable storage media as recited in claim 7, wherein the operations further comprise, prior to the receiving the call, receiving HTML content that contains a script that activates or instantiates the third party object.

9. The one or more computer-readable storage media as recited in claim 8, wherein the ascertaining the domain context of the third party object comprises ascertaining a source identifier of the HTML content.

10. The one or more computer-readable storage media as recited in claim 7, wherein the making the domain context-based decision comprises refusing to allow the subsequent call to execute.

11. The one or more computer-readable storage media as recited in claim 7, wherein the making the domain context-based decision comprises allowing the subsequent call to execute.

12. The one or more computer-readable storage media as recited in claim 7, wherein the receiving the call that requests the domain context is performed by a web browser.

13. A computing device comprising:
one or more processors; and
one or more computer-readable storage media comprising computer executable instructions stored thereon that, responsive to execution by the one or more processors, cause the one or more processors to:
receive a call from a third party object that requests a domain context;
ascertain the domain context of the third party object;
return the domain context to the third party object;
require the third party object to include its associated domain context in subsequent calls that the third party object makes;
receive a subsequent call from the third party object;
ascertain, from the subsequent call, the domain context of the third party object; and
make a domain context-based decision based on the ascertained domain context by refusing to allow the subsequent call to execute if the third party object's ascertained domain context does not match a target window domain context or allowing the subsequent call to execute if the third party object's ascertained domain context matches the target window domain context.

14. The computing device as recited in claim 13, wherein prior to receiving the call, the computer executable instructions, responsive to execution by the one or more processors, cause the one or more processors to receive HTML content that contains a script that activates or instantiates the third party object.

15. The computing device as recited in claim 14, wherein the computer executable instructions, responsive to execution by the one or more processors, cause the one or more processors to ascertain the domain context of the third party object by ascertaining a source identifier of the HTML content.

16. The computing device as recited in claim 13, wherein the computer executable instructions, responsive to execution by the one or more processors, cause the one or more processors to make the domain context-based decision by refusing to allow the subsequent call to execute.

17. The computing device as recited in claim 13, wherein the computer executable instructions, responsive to execution by the one or more processors, cause the one or more processors to make the domain context-based decision by allowing the subsequent call to execute.

18. The computing device as recited in claim 13, wherein the receiving the call that requests the domain context is performed by a web application.

19. The computing device as recited in claim 13, wherein the receiving the call that requests the domain context is performed by a web-based email application.

20. The computing device as recited in claim 13, wherein the receiving the call that requests the domain context is performed by a web browser.

* * * * *